United States Patent
Higure (10) Patent No.: US 9,119,004 B2
(45) Date of Patent: Aug. 25, 2015

(54) WIRELESS DEVICE

(75) Inventor: Kinichi Higure, Tokyo (JP)

(73) Assignee: HITACHI KOKUSAI ELECTRIC INC., Tokyo (JP)

( * ) Notice: Subject to any disclaimer, the term of this patent is extended or adjusted under 35 U.S.C. 154(b) by 370 days.

(21) Appl. No.: 13/702,780

(22) PCT Filed: Aug. 19, 2011

(86) PCT No.: PCT/JP2011/068753
§ 371 (c)(1),
(2), (4) Date: Dec. 7, 2012

(87) PCT Pub. No.: WO2012/053277
PCT Pub. Date: Apr. 26, 2012

(65) Prior Publication Data
US 2013/0083931 A1    Apr. 4, 2013

(30) Foreign Application Priority Data
Oct. 19, 2010   (JP) .................. 2010-234466

(51) Int. Cl.
*H04B 1/10* (2006.01)
*H04R 29/00* (2006.01)
*H04B 1/16* (2006.01)
*H04R 3/00* (2006.01)

(52) U.S. Cl.
CPC ............ *H04R 29/001* (2013.01); *H04B 1/1638* (2013.01); *H04R 3/00* (2013.01); *H04R 2410/00* (2013.01); *H04R 2420/07* (2013.01)

(58) Field of Classification Search
CPC .......... H04B 1/68; H04B 1/64; H04B 14/006; H04B 1/04; H04B 1/1638; H04B 1/28; H04B 1/405; H04B 7/12; H04B 7/2606; H04W 88/027; H04W 88/188; H04L 27/0006
USPC ........................................................ 455/701
See application file for complete search history.

(56) References Cited

U.S. PATENT DOCUMENTS 6,671,504 B1 * 12/2003 Myers ........................... 455/212
2010/0130149 A1 * 5/2010 Zhang et al. .................. 455/222

FOREIGN PATENT DOCUMENTS

| EP | 1039716 A1 * | 9/2000 | ............. H04L 27/26 |
|----|----|----|----|
| JP | S63031318 | 2/1988 | |
| JP | S6397928 | 6/1988 | |
| JP | H2101825 | 4/1990 | |
| JP | 2003218732 | 7/2003 | |
| JP | 2009177523 | 8/2009 | |

* cited by examiner

Primary Examiner — Ajibola Akinyemi
(74) Attorney, Agent, or Firm — Bacon & Thomas, PLLC (57) ABSTRACT

A wireless device capable of reliably detecting a tone squelch signal in a short time is provided. The wireless device which detects a tone squelch signal contained in received baseband signals is provided with: a frequency shifting unit (quadrature demodulation unit (503)) which shifts the received baseband signal in the negative frequency direction by a preset frequency of a tone squelch signal; LPF (504-1, 504-2) for eliminating unnecessary frequency components from the output of the frequency shifting unit; and an assessment unit (510) which assesses presence/non-presence of the tone squelch signal on the basis of the output from the LPF (504-1, 504-2).

9 Claims, 9 Drawing Sheets

(a) SPECTRUM OF x(t)

(b) SPECTRUM OF s(t)

(c) SPECTRUM OF q(t)

(d) SPECTRUM OF q'(t)

(a) SPECTRUM OF x(t)

(b) SPECTRUM OF s(t)

(c) SPECTRUM OF q(t)

(d) SPECTRUM OF $q_1'(t)$

METHOD BY PERIOD DETECTION

WIRELESS DEVICE

FIELD OF THE INVENTION

The present invention relates to a wireless device, and more particularly to a wireless device capable of reliably detecting a tone signal in detection of a tone squelch signal, and shortening the detection time.

BACKGROUND OF THE INVENTION

In a wireless device, a squelch circuit is provided to shut off raspy and unpleasant noise outputted from a speaker or the sound sent from the other party who does not need to communicate, and to maintain a silent state when there is no signal.

[Method of Squelch Circuit]

As schemes of the squelch circuit, there are (1) carrier squelch, (2) noise squelch, (3) tone squelch (Continuous Tone-Coded Squelch System (CTCSS)), and (4) digital coded squelch.

The carrier squelch is a scheme of muting (sound deadening) a speaker by a level of a received carrier. The noise squelch is a scheme for detecting a noise component of the output of a demodulator, and muting the speaker by the level. In both schemes, there is no need to add a special signal on the transmission side.

On the other hand, the tone squelch is a scheme of superimposing the tone on a low frequency band (e.g., a band of 0 to 300 Hz) of a baseband signal, and detecting the tone on the receiving side, thereby controlling muting of the speaker. The digital coded squelch is a scheme of superimposing a code sequence of NRZ (Non Return to Zero) on the band of 0 to 300 Hz of the baseband signal, and detecting the code sequence on the receiving side, thereby controlling muting of the speaker.

Hereinafter, the conventional tone squelch technique will be described.

[Tone Squelch Signal]

For example, in the standards "Wireless equipment of simple radio station of 400 MHz band" (RCR STD-10 4.1 Version), tone squelch signals of 33 types (frequencies) are specified in a frequency range from 67 Hz to 250.3 Hz.

In the wireless device conforming to the standards described above, it is necessary to identify all of these 33 types of tone squelch signals. Among these 33 types of tone squelch signals, signals with the most adjacent frequencies are a tone squelch signal of 100 Hz and a tone squelch signal of 103.5 Hz, and a difference between them is 3.5 Hz.

Figure 8A:
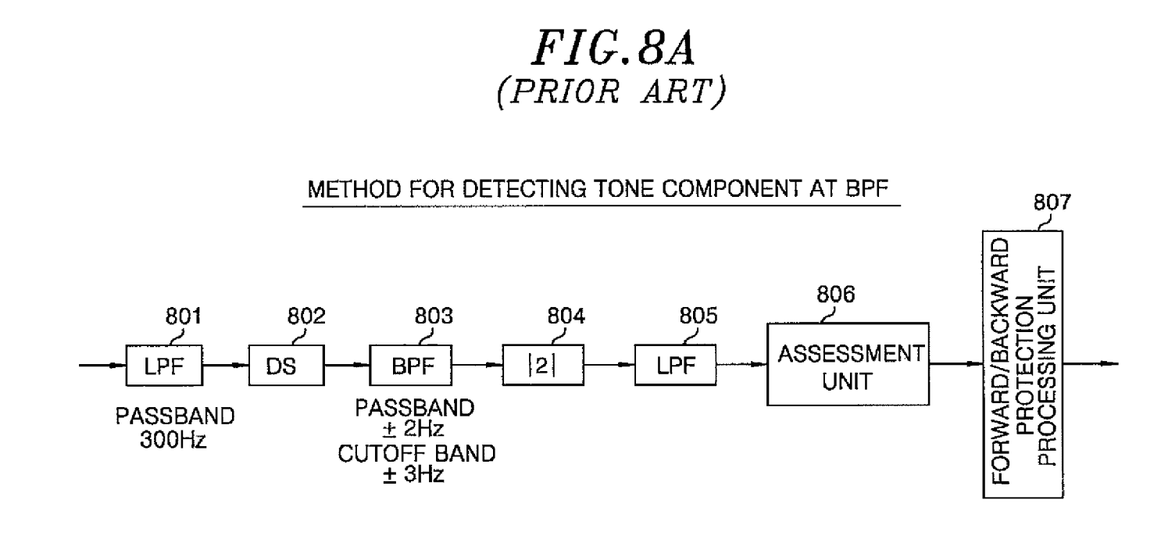
FIGS. 8A and 8B show block diagrams of configurations of conventional tone squelch detection units.

[First Conventional Tone Squelch Detection Unit: FIG. 8A]

A first conventional tone squelch detection unit will be described with reference to FIG. 8A. FIG. 8A is a block diagram illustrating a configuration of the first conventional tone squelch detection unit. Further, in the configuration of FIG. 8A, a method for detecting a tone component in a band pass filter (BPF) is used.

The first conventional tone squelch detection unit includes, as illustrated, a low pass filter (LPF) 801, a down sampler (DS) 802, a band pass filter (BPF) 803, a square calculation unit 804, a low pass filter (IPF) 805, an assessment unit 806 and a forward/backward protection processing unit 807.

[Operation of First Conventional Tone Squelch Detection Unit]

The operation of the first conventional tone squelch detection unit will be described.

Only the component of 300 Hz or less is extracted from the baseband signal by the LPF 801, and after the sampling frequency is reduced by the DS 802, only a desired tone frequency component is extracted by the BPF 803.

The tone signal extracted by the BPF 803 is allowed to pass through the square calculation unit 804 and the LPF 805 in order to commutate, and the assessment of the level of the tone signal is made by the assessment unit 806. If the level is higher than an assessment threshold value, "1" is inputted to the forward/backward protection processing unit 807, and if not, "0" is inputted to the forward/backward protection processing unit 807.

When "1" is consecutively inputted a preset number of times corresponding to the number $N_B$ of backward protection stages, the forward/backward protection processing unit 807 outputs "1" and performs unmute control. When "0" is consecutively inputted a preset number of times corresponding to the number $N_F$ of forward protection stages, the forward/backward protection processing unit 210 outputs "0" and performs mute control.

In this case, since the LPF 801 is used in order to prevent aliasing of frequency components due to down sampling by the down sampler (DS) 802 located in the subsequent stage, steep characteristics are not required, and the group delay can be reduced.

However, in the BPF 803, in order to identify the above-mentioned 33 types of tone signals, e.g., it is necessary to set the passband to a narrow band satisfying $f_{TONE}-2$ Hz$\leq f \leq f_{TONE}+2$ Hz, and to set the cutoff band to a narrow band satisfying $f \leq f_{TONE}-3$ Hz and $f \geq f_{TONE}+3$ Hz ($f_{TONE}$ is the frequency of the tone signal to be identified). If the 20, filter is designed in such conditions, the group delay increases to 100 to 200 ms.

In addition, since the delay occurs in the LPF 805 (e.g., 80 ms) and the forward/backward protection processing unit 807 (e.g., 80 ms) (total 360 ms =200 +80 +80), it is difficult to achieve the reception response time of 250 ms or less, which is specified in the above-mentioned standards.

Figure 8B:
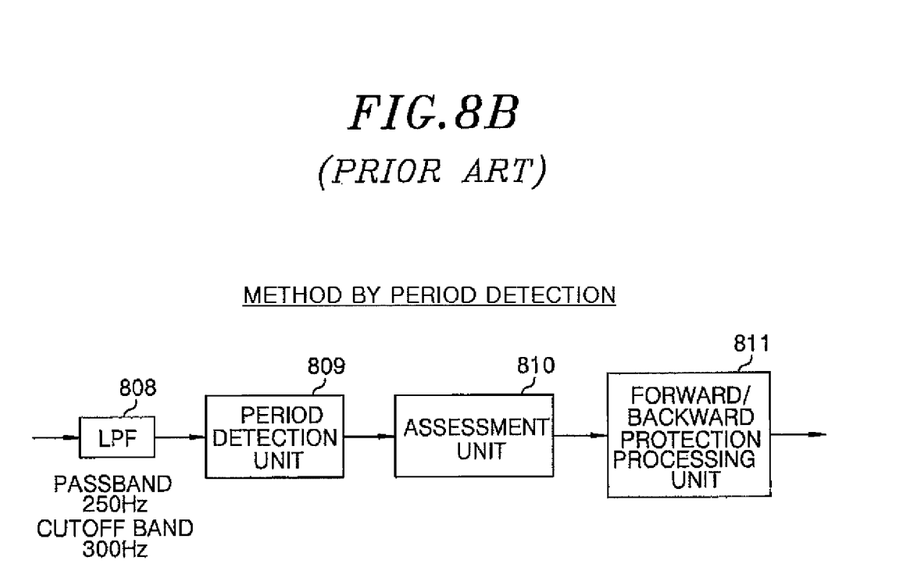

[Second Conventional Tone Squelch Detection Unit: FIG. 8B]

A second conventional tone squelch detection unit will be described with reference to FIG. 8B. FIG. 8B is a block diagram illustrating a configuration of the second conventional tone squelch detection unit. Further, in the configuration of FIG. 8B, a method according to the period detection of the time waveform is used.

The second conventional tone squelch detection unit includes, as illustrated, a low pass filter (LPF) 808, a period detection unit 809, an assessment unit 810, and a forward/backward protection processing unit 811.

[Operation of Second Conventional Tone Squelch Detection Unit]

The operation of the second conventional tone squelch detection unit will be described.

The component of, e.g., 250 Hz or less is extracted from the baseband signal by the LPF 808, and the period is detected by the period detection unit 809 and inputted to the assessment unit 810.

The assessment unit 810 assesses whether the inputted period falls within a period range corresponding to the desired frequency of the tone signal, and if so, the assessment unit 810 inputs "1" and, if otherwise, inputs "0" to the forward/backward protection processing unit 811.

The forward/backward protection processing unit 811 performs the same operation as the first conventional tone squelch detection unit, and performs unmute control or mute control of a speaker according to the results.

In this case, in the LPF 808, since the tone squelch signal specified by the above-mentioned standards has the highest frequency of 250.3 Hz, the passband is set to f≤250 Hz, and since the audio band is equal to or greater than 300 Hz, the cutoff band (stop band) is set to f≥300 Hz.

In the second tone squelch detection unit, since the frequency of the tone squelch signal is estimated by the period detection, for example, in order to make the estimated frequency error within 3% of the desired frequency of the tone squelch signal, the sampling frequency becomes $f_s \geq f_{TONE}/0.03 = 250.3$ Hz/$0.03 = 8.3$ kHz (if $f_{TONE}$ is the highest frequency of 250.3 Hz), and the sampling frequency needs to be more than 30 times the frequency of the tone squelch signal.

Further, since the period detection is performed by zero crossing (detecting the passage of a zero point (zero cross point) of the AC voltage when switching on and off of an AC power supply), it is necessary to remove the DC offset of the baseband signal which appears due to the frequency deviation of the received carrier.

In addition, since pulse-liked noise appears in the baseband signal at the reception input level lower than a threshold level at which the peak power of the received input signal is equal to the peak power of the noise, the accuracy of the period detection is significantly degraded.

[Related Art]

As the relevant prior art, there is a "FM radio receiving apparatus" disclosed in Japanese Patent Application Publication No. 2009-177523.

In the method for detecting a desired tone component by the BPF having a narrow bandwidth (high Q) in the first conventional tone squelch detection unit, there is a problem such that the group delay of the BPF increases.

In addition, in the method of estimating the frequency by detecting the period of the time waveform in the second conventional tone squelch detection unit, since it is necessary to make the sampling frequency very high with respect to the signal component, and it is necessary to correct the DC offset, there is a problem such that the detection accuracy is deteriorated at a low reception input level.

SUMMARY OF THE INVENTION

In view of the above, the present invention provides a wireless device which reliably detects a tone squelch signal in a short time, and also provides a wireless device capable of lowering a sampling frequency required for frequency detection.

In accordance with an embodiment of the present invention, there is provided a wireless device for detecting a tone squelch signal contained in received baseband signals including: a frequency shifting unit which shifts a frequency of the received baseband signal in a negative frequency direction by a preset frequency of the tone squelch signal; a LPF which removes unnecessary frequency components from an output of the frequency shifting unit; and an assessment unit which assesses a presence or absence of the tone squelch signal based on an output of the LPF.

In accordance with the present invention, a wireless device for detecting a tone squelch signal contained in received baseband signals is configured to include a frequency shifting unit which shifts a frequency of the received baseband signal in a negative frequency direction by a preset frequency of the tone squelch signal, LPFs which eliminate unnecessary frequency components from an output of the frequency shifting unit, and an assessment unit which assesses a presence or absence of the tone squelch signal based on an output of the LPFs. Therefore, it is possible to reliably detect the tone squelch signal in a short time.

DETAILED DESCRIPTION OF THE EMBODIMENTS

Hereinafter, embodiments of the present invention will be described with reference to the accompanying drawings.

[Wireless Device]

Figure 1:
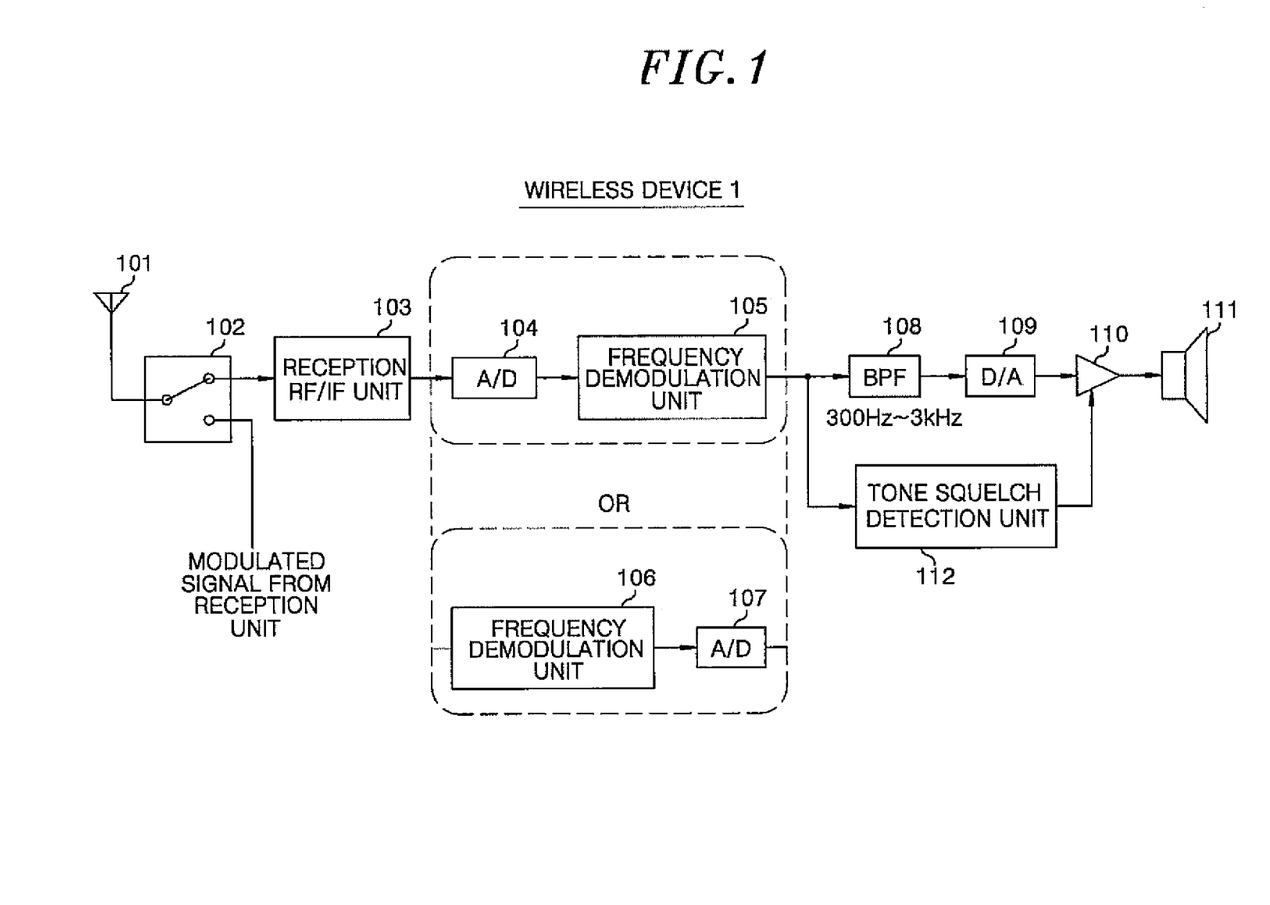
FIG. 1 is a block diagram showing a configuration of a wireless device in accordance with a first embodiment of the present invention.

A wireless device in accordance with an embodiment of the present invention is a wireless device in an analog frequency modulation (FM) scheme, and its configuration is shown in FIG. 1.

Further, in the wireless device shown in FIG. 1, the tone squelch signal of the above-mentioned standards is used.

<First Embodiment>

As shown in FIG. 1, a wireless device 1 includes an antenna 101, an antenna switch 102, a reception Radio Frequency/Intermediate Frequency (RF/IF) unit 103, an Analog-to-Digital (A/D) converter 104, a frequency demodulation unit 105, a Band Pass Filter (BPF) 108, a Digital-to-Analog (D/A) converter 109, an audio amplifier 110, a speaker 111 and a tone squelch detection unit 112.

Further, instead of the A/D converter 104 and the frequency demodulation unit 105, a frequency demodulation unit 106 and an A/D converter 107 may be provided by reversing the order of connection. In this case, the frequency demodulation unit 106 performs frequency demodulation by an analog circuit.

The wireless device 1 further includes a transmission system. However, since the transmission system has the same configuration as that of a wireless device in a general analog FM modulation scheme with a tone squelch function, and does not have a direct relationship with the gist of the present invention, an illustration and explanation thereof will be omitted.

[Receiving Operation]

An FM modulated signal received from the antenna 101 passes through the antenna switch 102, and is amplified and frequency-converted into an IF signal by the reception RF/IF unit 103.

The IF signal is sampled, quantized, and converted into a digital signal by the A/D converter 104.

The converted digital signal is frequency-demodulated by the frequency demodulation unit 105, and a baseband signal is inputted to the BPF 108 and the tone squelch detection unit 112.

Alternatively, the frequency-converted IF signal from the reception RF/IF unit 103 is frequency-demodulated by the frequency demodulation unit 106, and is sampled, quantized, and converted into a digital signal by the A/D converter 107. The converted digital signal is inputted to the BPF 108 and the tone squelch detection unit 112.

The BPF 108 extracts an audio component of 300 Hz to 3 kHz from the baseband signal inputted from the frequency demodulation unit 105 or the A/D converter 107. The audio component is converted into an analog signal by the D/A converter 109. Then, the analog signal is outputted to the speaker 111 via the audio amplifier 110.

Also, generally, a de-emphasis circuit which performs processing such that an output voltage is inversely proportional to the frequency, an expander circuit which increases a dynamic range of an audio signal, and a descrambling circuit which cancels the scrambling are provided between the BPF 108 and the D/A converter 109 or between the D/A converter 109 and the audio amplifier 110, but they will be omitted.

The tone squelch detection unit 112 extracts a component of 0 to 300 Hz from the baseband signal inputted from the frequency demodulation unit 105 or the A/D converter 107, and identifies a tone signal contained therein. If it contains a desired tone signal, the tone squelch detection unit 112 unmutes the audio amplifier 110 (sound generating), and if it does not contain a desired tone signal, the tone squelch detection unit 112 mutes the audio amplifier 110 (sound deadening).

[Tone Squelch Detection Unit]

Figure 2:
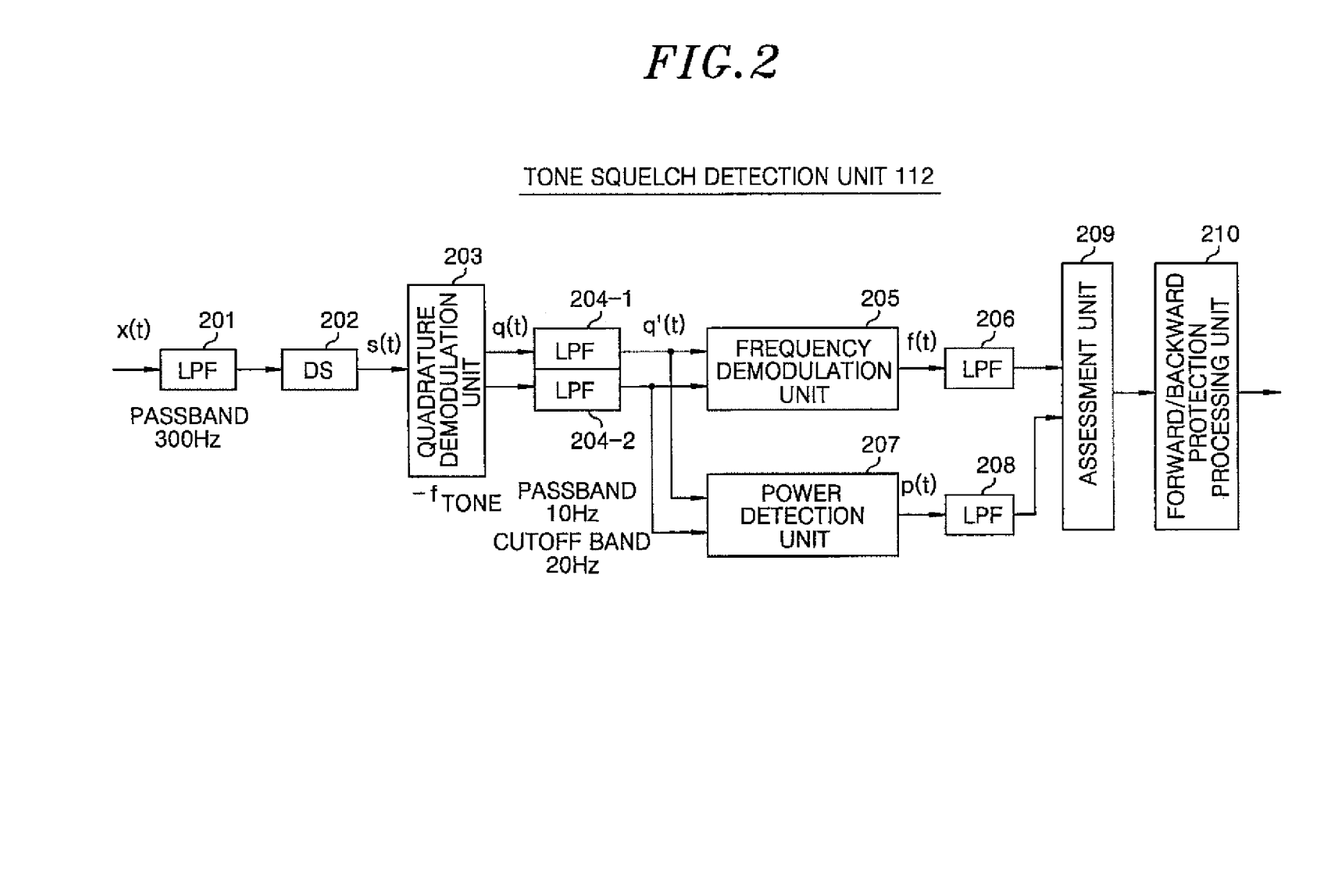
FIG. 2 is a block diagram showing a configuration of a tone squelch detection unit of FIG. 1.

The tone squelch detection unit 112 in accordance with the first embodiment of the present invention will be described with reference to FIG. 2. FIG. 2 is a block diagram showing a configuration of the tone squelch detection unit 112.

The tone squelch detection unit 112 includes, as shown in FIG. 2, a low pass filter (LPF) 201, a down sampler (DS) 202, a quadrature demodulation unit 203, two low pass filters (LPFs) 204-1 and 204-2, a frequency demodulation unit 205, a low pass filter (LPF) 206, a power detection unit 207, a low pass filter (LPF) 208, an assessment unit 209 and a forward/backward protection processing unit 210.

Each part of the tone squelch detection unit 112 will be described in detail.

The LPF 201 is a filter for passing a low frequency component of the inputted baseband signal x(t), and a passband is set to 300 Hz. That is, the LPF 201 eliminates a frequency component equal to or greater than 300 Hz used for audio transmission and passes a frequency component less than 300 Hz.

The down sampler (DS) 202 decreases the sampling frequency by down-sampling the signal that has passed through the LPF 201, and outputs the tone squelch signal s(t) to the quadrature demodulation unit 203.

The quadrature demodulation unit 203 performs quadrature demodulation by shifting the frequency of the tone squelch signal s(t) inputted from the DS 202 by a frequency of only $-f_{TONE}$ (shifting the frequency by a frequency of the tone squelch signal that is set in its own unit, i.e., the tone squelch signal which causes unmuting when received, in the negative frequency direction) and outputs a real part of the quadrature demodulated output q(t) to the LPF 204-1 and an imaginary part thereof to the LPF 204-2.

In addition, it is conceivable that instead of the frequency shift by the quadrature demodulation unit, FFT is performed for processing in a frequency domain and IFFT is performed. However, from the viewpoint of processing amount, the frequency shift by the quadrature demodulation unit is preferable.

The LPFs 204-1 and 204-2 are filters for passing low frequency components of the real and imaginary parts of the quadrature demodulated output q(t) to remove unnecessary frequency components, respectively.

In the LPFs 204-1 and 204-2, specifically, the passband is set to 10 Hz (i.e., the edge frequency (cutoff frequency) of the passband is set to 10 Hz), and the cutoff band (stop band) is set to 20 Hz (i.e., the edge frequency of the cutoff band is set to 20 Hz). Further, in this specification, the cutoff band means a frequency band in which the attenuation amount of the signal having passed is an arbitrary attenuation amount (e.g., −30 dB).

In addition, as each LPF used in this embodiment, for example, a digital filter (IIR (Infinite Impulse Response) filter) is used.

The frequency demodulation unit 205 performs frequency demodulation on an output signal Re [q'(t)] of the LPF 204-1 and an output signal Im [q'(t)] of the LPF 204-2 to detect an instantaneous frequency f(t) and outputs the instantaneous frequency f(t) to the LPF 206.

The frequency demodulation unit 205, specifically, includes a phase detection unit and a differential processing unit. The phase detection unit calculates a phase (instantaneous phase as a function of time t) on the complex plane by the following equation.

$$\theta(t)=\tan^{-1}(\text{imaginary/real})$$

Further, the differential processing unit calculates the instantaneous frequency f(t) by time-differentiating θ(t) as in the following equation.

$$f(t)=d\theta(t)/dt$$

The LPF 206 smoothes the fluctuation of the instantaneous frequency f(t) inputted from the frequency demodulation unit 205, and outputs it to the assessment unit 209.

The power detection unit 207 performs power detection on the output signal Re [q'(t)] of the LPF 204-1 and the output signal Im [q'(t)] of the LPF 204-2 and outputs an instantaneous power p(t) to the LPF 208. Further, the power detection is performed, e.g., by adding the squared value of the signal Re [q'(t)] and the squared value of the signal Im [q'(t)].

The LPF 208 smoothes the fluctuation of the instantaneous power p(t) inputted from the power detection unit 20, and outputs it to the assessment unit 209.

The assessment unit 209 receives the frequency (frequency information) smoothed by the LPF 206, and the power (power information) smoothed by the LPF 208, and assesses whether or not the frequency information is within a predetermined frequency range ($\pm f_{th}$, e.g., 0 Hz±2 Hz) that has been set in advance, and whether or not the power information is equal to or greater than a predetermined power value that has been set in advance.

Then, the assessment unit 209 outputs "1" to the forward/backward protection processing unit 210 if the frequency information is within the predetermined frequency range and the power information is equal to or greater than the predetermined power value, and outputs "0" to the forward/backward protection processing unit 210 if the frequency information is out of the predetermined frequency range, or if the frequency information is within the predetermined frequency range and the power information is less than the predetermined power value.

When "1" is consecutively inputted from the assessment unit 209 the preset number of times corresponding to the number $N_B$ of the backward protection stages, the forward/backward protection processing unit 210 unmutes the audio amplifier 110 (mute OFF). When "0" is consecutively inputted from the assessment unit 209 the preset number of times corresponding to the number $N_F$ of the forward protection stages, the forward/backward protection processing unit 210 mutes the audio amplifier 110 (mute ON).

Now, there will be described the reason that the assessment in the assessment unit 209 is made based on both the frequency information and the power information.

When the signal that does not contain the tone squelch signal transmitted from the transmission side is demodulated at the receiving side, there is no signal in the band of 0 to 300 Hz in which the tone squelch signal is superimposed, and only the thermal noise of a receiver (which varies depending on the RE input level of the receiver) can be detected in the band.

Since the frequency of the tone squelch signal is detected by frequency demodulation thereof, the detected frequency changes randomly due to the thermal noise. Since it changes randomly, it is often out of the desired frequency range (the above-described predetermined frequency range ($\pm f_{th}$)), but occasionally it falls within the range of $\pm f_{th}$, and it may be erroneously detected. Therefore, the power information on the tone squelch signal is also used as an AND condition.

Further, if the tone squelch signal is superimposed on the transmitting side, since the amplitude is specified, in the assessment unit 209, a power value sufficiently lower than that is used as the above-mentioned predetermined power value.

[Internal Signal Spectrum]

Next, the internal signal spectrum in the tone squelch detection unit 112 will be described with reference to FIG. 3.

Figure 3:
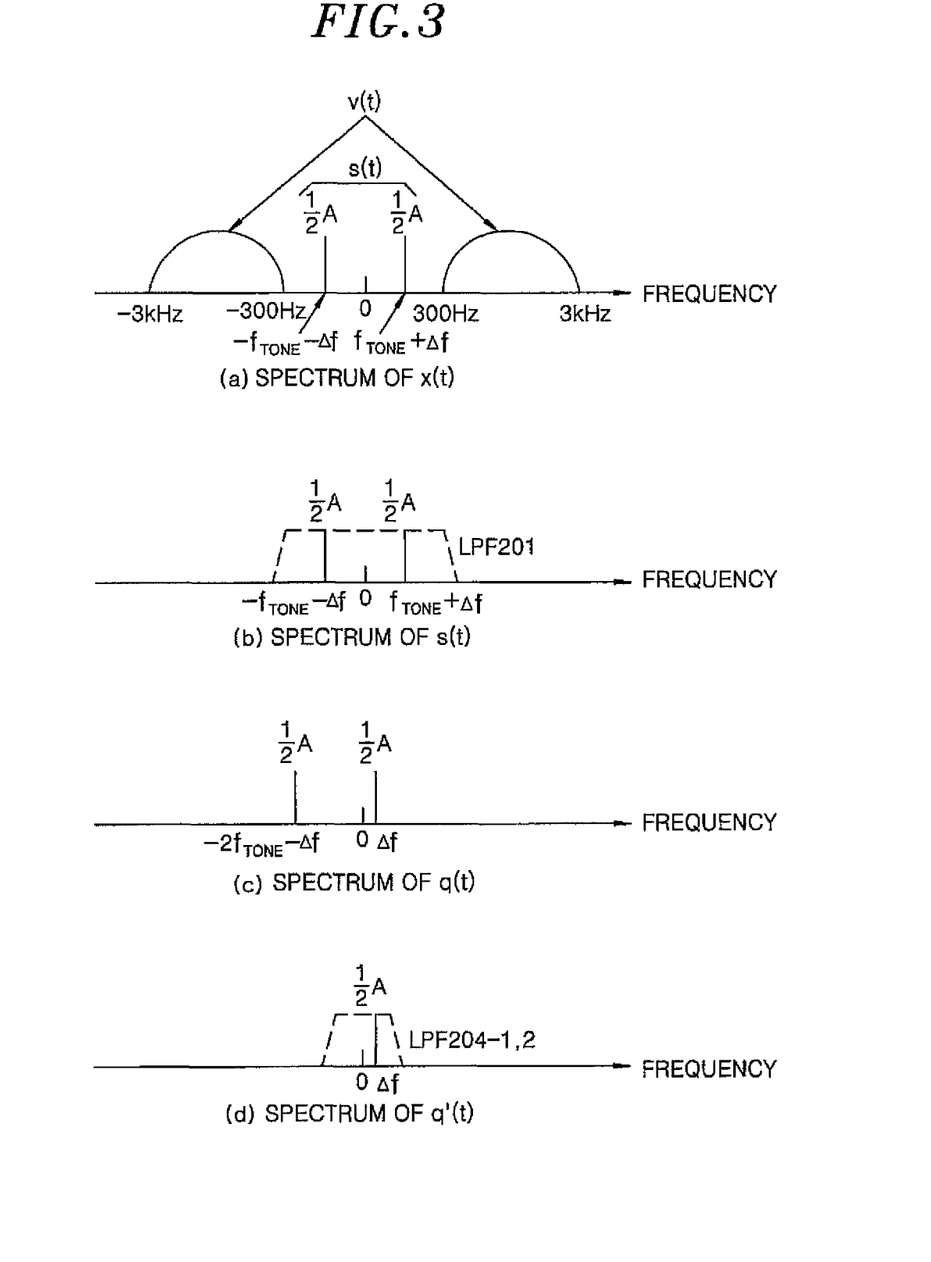
FIG. 3 shows the internal signal spectrum in the tone squelch detection unit of FIG. 1.

In FIG. 3, (a) represents the spectrum of the baseband signal x(t) inputted to the LPF 201, (b) represents the spectrum of the tone squelch signal s(t) from the DS 202, (c) represents the quadrature demodulated output q(t) from the quadrature demodulation unit 203, and (d) represents the quadrature demodulated output q'(t) from the LPFs 204-1 and 204-2.

[Operation of Tone Squelch Detection Unit]

The frequency-demodulated baseband signal x(t) is inputted to the LPF 201. The baseband signal x(t) can be expressed as shown in the following Eq. 1.

$$x(t) = s(t) + v(t) \quad \text{[Eq. 1]}$$

In Eq. 1, s(t) is the received tone squelch signal, and v(t) is a signal component of the audio band. Further, the tone squelch signal s(t) can be expressed as shown in the following Eq. 2.

$$s(t) = A \cos 2\pi(f_{TONE} + \Delta f)t \quad \text{[Eq. 2]}$$

In Eq. 2, A is the amplitude of the tone squelch signal which is superimposed at the transmission side, $f_{TONE}$ is the frequency (any frequency of 33 types as described above) of the tone squelch signal, and $\Delta f$ is a deviation of the tone frequency generated on the transmission side.

The LPF 201 removes the signal component v(t) equal to or greater than 300 Hz containing the signal of the audio band from the baseband signal x(t), and the tone squelch signal s(t) is inputted to the quadrature demodulation unit 203 after reducing the sampling frequency by the down sampler DS 202.

The quadrature demodulation unit 203 shifts the frequency of the tone squelch signal s(t) by $-f_{TONE}$, and inputs the quadrature demodulated real part and imaginary part to the LPF 204-1 and the LPF 204-2, respectively.

In the quadrature demodulation unit 203, if the frequency is not shifted, originally, components of $-f_{TONE}-\Delta f$ and $f_{TONE}+\Delta f$ are outputted, but components of $-2f_{TONE}-\Delta f$ and $\Delta f$ are outputted by shifting the frequency by $-f_{TONE}$.

The quadrature demodulated output q(t) from the quadrature demodulation unit 203 can be expressed as shown in the following Eq. 3.

$$q(t) = s(t)e^{-j2\pi f_{TONE}t} \quad \text{[Eq. 3]}$$
$$= \frac{1}{2}A\{e^{j2\pi\Delta ft} + e^{-j2\pi(2f_{TONE}+\Delta f)t}\}$$

The spectrum of the quadrature demodulated output q(t) includes, as shown in (c) of FIG. 3, the component of $\Delta f$ and the component of $-2f_{TONE}-\Delta f$. Since the component of $-2f_{TONE}-\Delta f$ is not necessary, it is removed by the LPFs 204-1 and 204-2.

That is, the quadrature demodulation unit 203 shifts the frequency by $-f_{TONE}$ in order to easily remove the component of $-2f_{TONE}-\Delta f$ by the LPFs 204-1 and 204-2.

The output of the LPFs 204-1 and 204-2 can be expressed as shown in the following Eq. 4 after removing the second term of Eq. 3.

$$q'(t) = \frac{1}{2}Ae^{j2\pi\Delta ft} \quad \text{[Eq. 4]}$$

The frequency demodulation unit 205 detects the instantaneous frequency f(t) of q'(t). In the absence of noise, the output is detected as the deviation $\Delta f$ of the tone frequency generated at the transmission side. However, depending on the reception level, the pulse-like noise is superimposed on x(t) by the noise inputted to the frequency demodulation unit 105 or the frequency demodulation unit 106 shown in FIG. 1, so that the detected frequency fluctuates.

Therefore, the LPF 206 smoothes the fluctuation of the detected frequency. Further, in order to exclude a case where the squelch signal is not superimposed on 0 to 300 Hz from the detection, the instantaneous power p(t) of q'(t) is calculated by the power detection unit 207. The instantaneous power p(t) can be expressed as shown in the following Eq. 5.

$$p(t) = |q'(t)|^2 \quad \text{[Eq. 5]}$$
$$= \frac{1}{4}A^2$$

Similarly to the instantaneous frequency f(t), since the instantaneous power p(t) also fluctuates depending on the reception level, smoothing is performed by the LPF 208.

After receiving the frequency information outputted from the LPF 206 and the power information inputted from the LPF 208, if the frequency information is within the predetermined frequency range ($\pm f_{th}$ (e.g., $f_{th}$ =2Hz)) and the power information is equal to or greater than the predetermined power value $p_{th}$ (e.g., $p_{th}$ =0.1 $\times A^2/4$ (−10 dB of $A^2/4$)), the assessment unit 209 outputs "1" and, if otherwise, outputs "0" to the forward/backward protection processing unit 210. Since the operation of the forward/backward protection processing unit 210 is not different from the prior art, a description thereof will be omitted.

By the smoothing process of the LPF 206 and the LPF 208 and the forward protection process of the forward/backward protection processing unit 210, even when the reception level is low and the pulse-like noise is superimposed on the baseband signal, the tone squelch signal can be stably detected and it is possible to unmute the speaker 111. Further, by the backward protection process of the forward/backward protection processing unit 210, it is possible to prevent erroneous detection when the radio is not inputted.

There are 33 types of tone frequencies in the above-mentioned standards, but the tone squelch detection circuit in accordance with the present embodiment detects an arbitrary (one type) signal among them.

As a practical use method, one type of frequency is set among 33 types in the setting of the wireless device, a tone squelch signal of the set frequency is transmitted while being superimposed on the audio, and the speaker is sounded (unmated) only when detecting the tone squelch signal of the same frequency as the set frequency on the reception side.

Further, the frequency of the tone squelch signal may be set to be selected from among 33 types as a unique value of the wireless device at the time of manufacture, or may be set to an arbitrary value by a user or the like by using a switch or the like (not shown) provided in the wireless device.

in addition, since the DC offset of the baseband signal x(t) due to the frequency deviation of the received carrier is removed as out-of-band components of the LPFs 204-1 and 204-2, there is no need for the DC offset correction.

Now, there will be described the reason that the DC offset of the baseband signal due to the frequency deviation of the received carrier is out-of-band components of the LPFs 204-1 and 204-2.

The DC offset is 0 Hz at the time when the tone squelch signal s(t) ((b) of FIG. 3) is outputted from the DS 202.

In the output of the quadrature demodulation unit 203 ((c) of FIG. 3), since the frequency is shifted by a frequency of $-f_{TONE}$ the DC component becomes $-f_{TONE}$ (Hz). Since $f_{TONE}$ is 67 Hz as the lowest frequency (the lowest frequency of the tone squelch signal of the above-described standards), the frequency is located on the innermost side of the spectrum, and the possible minimum value of the DC component becomes −67 Hz.

Since the deviation of the tone signal on the transmission side is up to 0.5% in the above-mentioned standards, it is −67 Hz ×(1-0.005)=−66.665 Hz in a state where the frequency is the greatest.

Since the cutoff band of the LPFs 204-1 and 204-2 can be set to about 20 Hz even if Q is set considering the group delay, the DC component falls within the cutoff band even considering Δf, and is completely removed.

As an example, moving average processing of 80 ms is performed as processing of the LPF 206 and the LPF 208. The number of the forward protection stages is set to correspond to 80 ms, and the number for backward protection stages is set to correspond to 80 ms.

When the time required for detection is calculated by adding the moving average processing time (80 ms) of the LPF 206 and the LPF 208 and the backward protection time (80 ms) to the group delay of the LPF 201 which is equal to or less than 3 ms and the group delay of the LPFs 204-1 and 204-2 which is equal to or less than 50 ms, the total time is equal to or less than 213 ms, and it can satisfy the above-described reception response time, which is 250 ms or less.

As described above, in the wireless device 1 in accordance with the first embodiment of the present invention, the quadrature demodulation unit 203 shifts the frequency of the received baseband signal by a frequency of the tone squelch signal that is set in its own unit, i.e., the tone squelch signal which causes unmuting when received, in the negative frequency direction (toward 0 Hz). Accordingly, the band limitation can be achieved by the LPF, and the group delay can be significantly reduced compared with the case where the same bandwidth is achieved by the BPF. Therefore, the tone squelch signal can be detected reliably in a short time.

Furthermore, since a complex signal after quadrature demodulation is used, the phase information can be detected from the real and imaginary parts. Therefore, the sampling frequency required for frequency detection can be set to be low.

In addition, since the band of the LPFs 204-1 and 204-2 for filtering the output signal of the quadrature demodulation unit 203 can be narrowed even considering the group delay, it is possible to completely remove 300 Hz, which is the lowest frequency of the sound and the DC component (0 Hz) due to the RF frequency offset, and a malfunction due to them does not occur.

That is, since the maximum frequency of the tone squelch signal is 250.3 Hz, even if 300 Hz, which is the lowest frequency of the sound, is shifted by 250.3 Hz in the negative direction, it does not pass through the LPFs 204-1 and 204-2.

Further, since the minimum frequency of the tone squelch signal is 67 Hz, the DC component (0 Hz) becomes equal to or less than −67 Hz at the maximum, and similarly, it does not pass through the LPFs 204-1 and 204-2.

Further, since the passband of the LPFs 204-1 and 204-2 is equal to or less than 10 Hz, the tone signal whose frequency has a difference of 1.0 Hz or less from the desired tone frequency passes through the LPFs 204-1 and 204-2.

However, in the assessment unit 209, by providing an assessment threshold value (predetermined frequency range) less than a minimum value (3.5 Hz) of a frequency difference of 33 types of tone squelch signals, it is possible to prevent a malfunction caused by an undesirable tone signal.

In addition, since the presence or absence of the tone squelch signal is assessed by taking into consideration not only the presence or absence of the desired tone frequency, but also the power information, it is possible to suppress a malfunction due to thermal noise.

<Second Embodiment>

In the wireless device equipped with tone squelch, generally, a low frequency component (below 300 Hz in this specification) of the audio signal is removed by the HPF on the transmission side, and the tone squelch signal is superimposed on the band. However, depending on the wireless device, the cutoff characteristics of the HPF are not sufficient, and an audio component may remain in the band (below 300 Hz) on which the tone squelch signal is superimposed.

In the first embodiment described above, by performing the frequency detection of the tone squelch signal by the frequency demodulation unit 205, the identification of the tone squelch signal is performed. However, if the audio component remains in the band below 300 Hz, a malfunction may occur in the frequency detection performed by the frequency demodulation unit 205, and thus, it is impossible to identify the tone squelch signal. Also, it is controlled to be mute even during a call, and sound interruption may occur.

Further, by the LPFs 204-1 and 204-2 (passband of 10 Hz) and the frequency demodulation unit 205, the components within ±10 Hz of the frequency of the tone squelch signal are extracted and the frequency detection is performed. However, if a random noise is inputted to the tone squelch detection unit 112 without the received input, the noise is also band-limited to ±10 Hz of the frequency of the tone squelch signal. Then, since the detection value of which the frequency amplitude is small is inputted to the assessment unit 209 by frequency-demodulating the band-limited noise, the noise may be erroneously detected as the tone squelch signal.

Therefore, in a wireless device in accordance with a second embodiment of the present invention, in addition to reliably detecting the tone squelch signal in a short time while reducing the sampling frequency, it has been improved such that the tone squelch signal is detected even when the audio component is mixed in the superimposed band (below 300 Hz) of the tone squelch signal, and the noise when there is no input is not erroneously detected as the tone squelch signal.

Hereinafter, focusing on differences from the first embodiment, the wireless device in accordance with the second embodiment will be described.

[Wireless Device]

Figure 4:
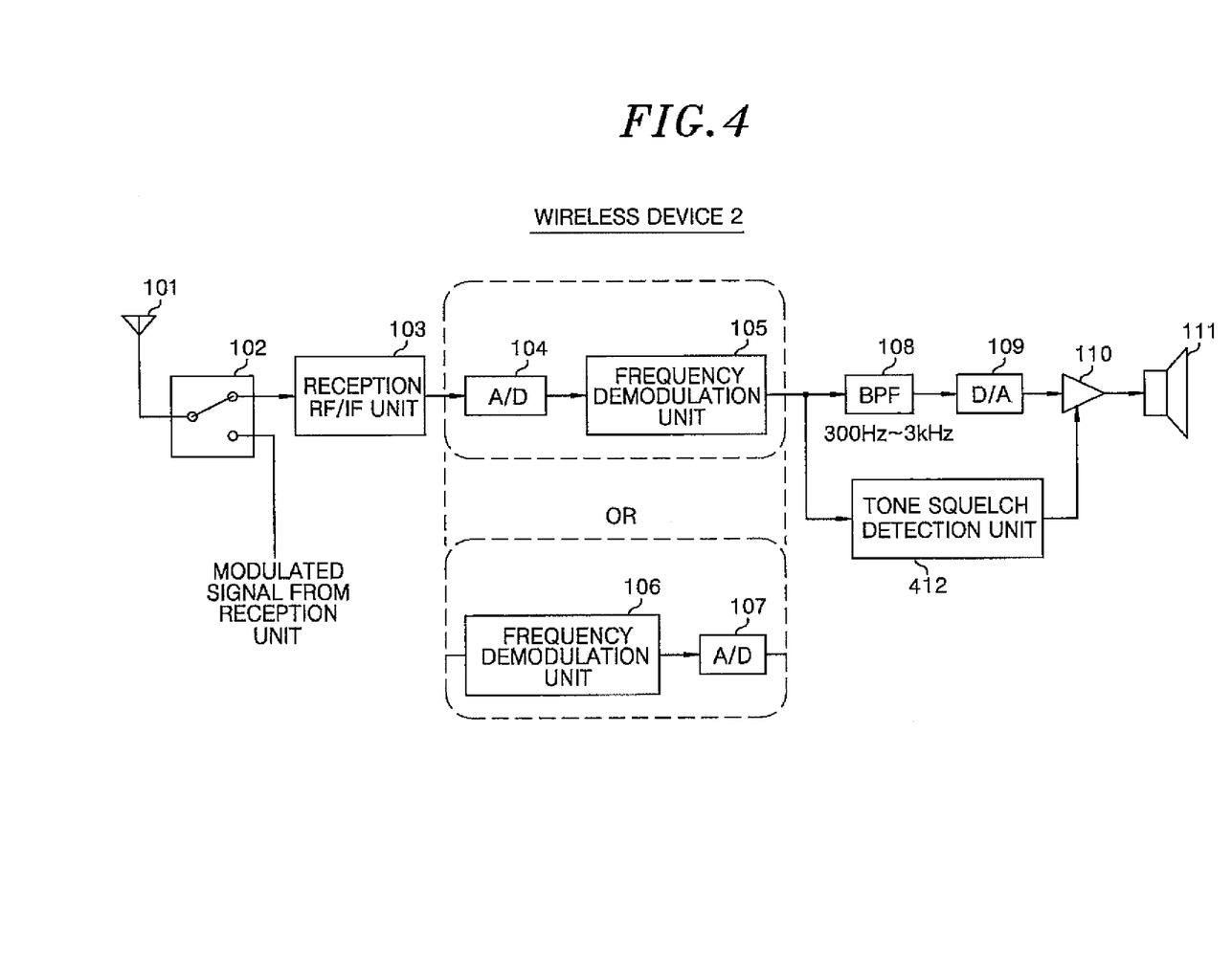
FIG. 4 is a block diagram showing a configuration of a wireless device in accordance with a second embodiment of the present invention.

FIG. 4 is a block diagram showing a configuration of the wireless device in accordance with the second embodiment. In FIG. 4, the same reference numerals as those of the wireless device 1 are assigned to the same components as those of the wireless device 1 in accordance with the first embodiment, and a description thereof will be omitted.

As illustrated, a wireless device 2 in accordance with the second embodiment is different from the wireless device 1 since it has a tone squelch detection unit 412.

[Tone Squelch Detection Unit]

Figure 5:
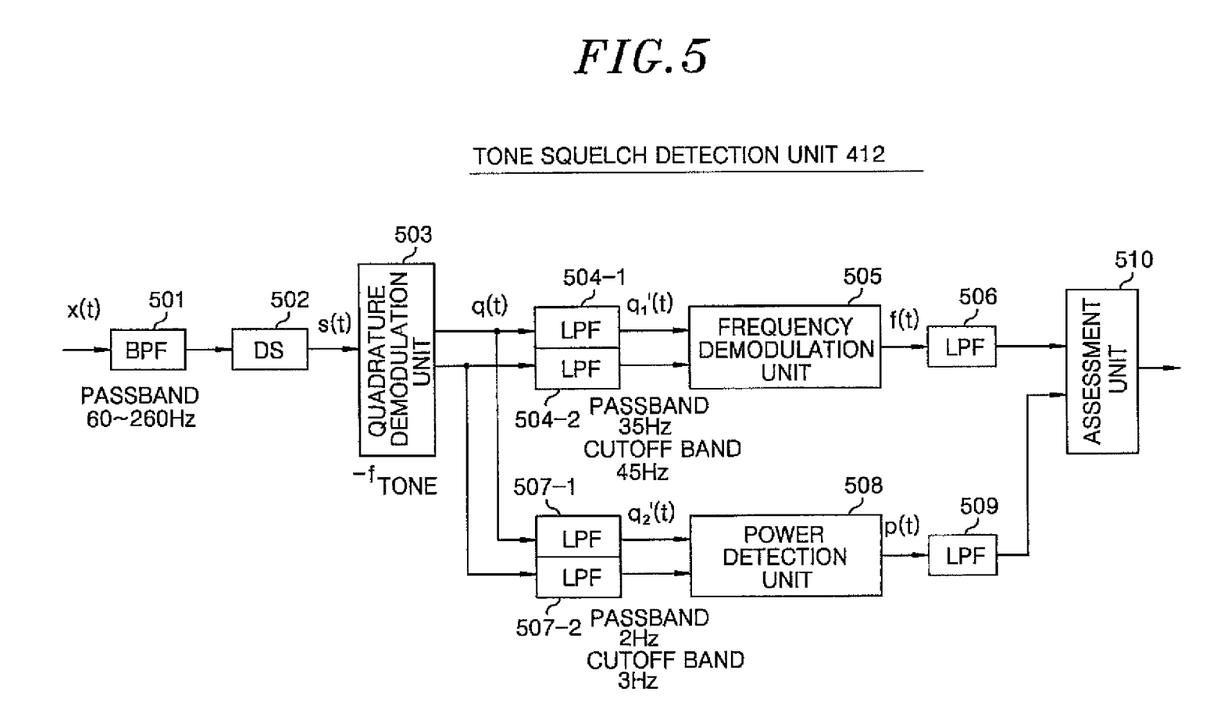
FIG. 5 is a block diagram showing a configuration of a tone squelch detection unit of FIG. 4.

FIG. 5 is a block diagram showing a configuration of the tone squelch detection unit 412.

As illustrated, the tone squelch detection unit 412 includes a band pass filter (BPF) 501, a down sampler (DS) 502, a quadrature demodulation unit 503, two low pass filters (LPFs) 504-1 and 504-2, a frequency demodulation unit 505, a low pass filter (LPF) 506, two low pass filters (LPFs) 507-1 and 507-2, a power detection unit 508, a low pass filter (LPF) 509 and an assessment unit 510.

Each part of the tone squelch detection unit 412 will be described in detail.

The BPF 501 is a filter for passing only a predetermined band for the inputted baseband signal x(t), and blocks the signals outside the frequency range of the tone squelch signal. Since the frequency of the tone squelch signal ranges from 67 Hz to 250.3 Hz in the above-mentioned standards, the passband of the BPF is set to, e.g., 60 to 260 Hz.

Further, instead of the BPF 501, similarly to the wireless device 1 in accordance with the first embodiment, the LPF may be used.

The down sampler (DS) 502 decreases the sampling frequency by down-sampling the signal that has passed through the BPF 501 and outputs the tone squelch signal s(t) to the quadrature demodulation unit 503.

The quadrature demodulation unit 503 performs quadrature demodulation by shifting the frequency of the tone squelch signal s(t) inputted from the DS 502 by a frequency of only $-f_{TONE}$ (shifting the frequency by a frequency of the tone squelch signal that is set in its own unit, i.e., the tone squelch signal which causes unmuting when received, in the negative frequency direction) and outputs real and imaginary parts of the quadrature demodulated output q(t).

The LPFs 504-1 and 504-2 are filters for passing low frequency components of the real and imaginary parts of the quadrature demodulated output q(t) to remove unnecessary frequency components, respectively.

With respect to the audio signal for the frequency ($f_{TONE}=67$ Hz to 250.3 Hz) of the tone squelch signal, the passband is set to 35 Hz and the cutoff band is set to 45 Hz in the LPFs 504-1 and 504-2 in order to remove the DC component ($-f_{TONE}$ in the input of the LPFs 504-1 and 504-2) and the component of 300 Hz or more (300$-f_{TONE}$ in the input of the LPFs 504-1 and 504-2). That is, the passband of the LPFs 504-1 and 504-2 is set to be less than the minimum frequency (67 Hz) of the tone squelch signal which is likely to be received, and less than the frequency obtained by subtracting the maximum frequency (250.3 Hz) of the tone squelch signal which is likely to be received from the minimum frequency (300 Hz) on which the audio signal is superimposed.

In addition, as each LPF used in this embodiment, similarly to the first embodiment, e.g., a digital filter (IIR (Infinite Impulse Response) filter) is used.

The frequency demodulation unit 505 performs frequency demodulation on an output signal Re [$q_1'(t)$] of the LPF 504-1 and an output signal Im [$q_1'(t)$] of the LPF 504-2 to detect an instantaneous frequency f(t) and outputs the instantaneous frequency f(t) to the LPF 506. Similarly to the first embodiment, the frequency demodulation unit 505 includes a phase detection unit and a differential processing unit.

The LPF 506 smoothes the fluctuation of the instantaneous frequency f(t) inputted from the frequency demodulation unit 505 and outputs it to the assessment unit 510.

The LPFs 507-1 and 507-2 are filters for passing low frequency components of the real and imaginary parts of the quadrature demodulated output q(t) to remove unnecessary frequency components, respectively. In the LPFs 507-1 and 507-2, e.g., the passband is set to 2 Hz, and the cutoff band is set to 3 Hz to remove components other than the desired tone squelch signal and its surroundings (error tolerance, e.g., ±2 Hz).

The power detection unit 508 performs power detection on the output signal Re [$q_2'(t)$] of the LPF 507-1 and the output signal Im [$q_2'(t)$] of the LPF 507-2 and outputs an instantaneous power p(t) to the LPF 509. Further, the power detection is performed, e.g., by adding the squared value of the signal Re [$q_2'(t)$] and the squared value of the signal Im [$q_2'(t)$].

The LPF 509 smoothes the fluctuation of the instantaneous power p(t) inputted from the power detection unit 508 and outputs it to the assessment unit 510.

The assessment unit 510 receives the frequency (frequency information) smoothed by the LPF 506, and the power (power information) smoothed by the LPF 509 and assesses the presence or absence of the tone squelch signal based on the information. If it is assessed that the tone squelch signal is present, the assessment unit 510 unmutes the audio amplifier 110 (mute OFF), and if it is assessed that the tone squelch signal is absent, the assessment unit 510 mutes the audio amplifier 110 (mute ON).

The assessment of the presence or absence of the tone squelch signal by the assessment unit 510 will be described in detail later.

[Internal Signal Spectrum]

Next, the internal signal spectrum in the tone squelch detection unit 412 will be described with reference to FIG. 6.

Figure 6:
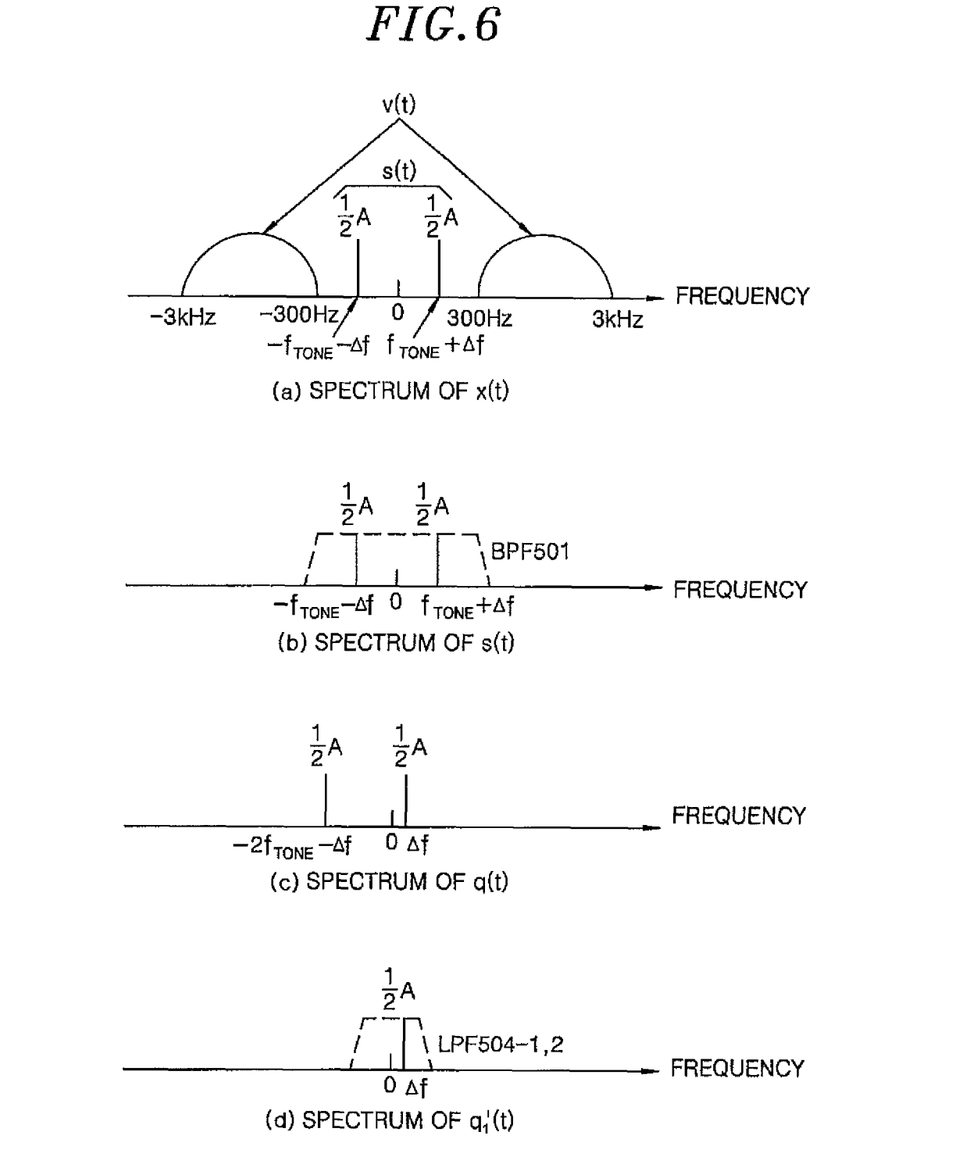
FIG. 6 shows the internal signal spectrum in the tone squelch detection unit of FIG. 4.

In FIG. 6, (a) represents the spectrum of the baseband signal x(t) inputted to the BPF 501, (b) represents the spectrum of the tone squelch signal s(t) from the DS 502, (c) represents the quadrature demodulated output q(t) from the quadrature demodulation unit 503, and (d) represents the quadrature demodulated output $q_1'(t)$ from the LPFs 504-1 and 504-2.

[Operation of Tone Squelch Detection Unit]

The frequency-demodulated baseband signal x(t) is inputted to the BPF 501. Similarly to the first embodiment, the baseband signal x(t) can be expressed as shown in the following Eq. 6.

$$x(t)=s(t)+v(t) \qquad [\text{Eq. 6}]$$

In Eq. 6, s(t) is the received tone squelch signal, and v(t) is a signal component of the audio band. Further, the tone squelch signal s(t) can be expressed as shown in the following Eq. 7.

$$s(t)=A\cos 2\pi(f_{TONE}+\Delta f)t \qquad [\text{Eq. 7}]$$

In Eq. 7, A is the amplitude of the tone squelch signal which is superimposed at the transmission side, $f_{TONE}$ is the frequency (any frequency of 33 types as described above) of the tone squelch signal, and $\Delta f$ is a deviation of the tone frequency generated on the transmission side.

The BPF 501 removes the signal component v(t) equal to or greater than 300 Hz containing the signal of the audio band from the baseband signal x(t), and the tone squelch signal s(t) is inputted to the quadrature demodulation unit 503 after reducing the sampling frequency by the down sampler DS 502.

The quadrature demodulation unit 503 shifts the frequency of the tone squelch signal s(t) by $-f_{TONE}$, inputs the quadrature demodulated real part to the LPFs 504-1 and 507-1, and inputs the quadrature demodulated imaginary part to the LPFs 504-2 and 507-2.

In the quadrature demodulation unit 503, if the frequency is not shifted, originally, components of $-f_{TONE}-\Delta f$ and $-f_{TONE}+\Delta f$ are outputted, but components of $-2f_{TONE}-\Delta f$ and $\Delta f$ are outputted by shifting the frequency by $-\Delta f_{TONE}$.

The quadrature demodulated output q(t) from the quadrature demodulation unit 503 can be expressed as shown in the following Eq. 8.

$$q(t) = s(t)e^{-j2\pi f_{TONE}t} \quad [\text{Eq. 8}]$$
$$= \frac{1}{2}A\{e^{j2\pi\Delta f t} + e^{-j2\pi(2f_{TONE}+\Delta f)t}\}$$

The spectrum of the quadrature demodulated output q(t) includes, as shown in (c) of FIG. 6, the component of $\Delta f$ and the component of $-2f_{TONE}-\Delta f$. Since the component of $-2f_{TONE}-\Delta f$ is not necessary, it is removed by the LPFs 504-1 and 504-2 and the LPFs 507-1 and 507-2.

That is, the quadrature demodulation unit 503 shifts the frequency by $-f_{TONE}$ in order to easily remove the component of $-2f_{TONE}-\Delta f$ in the LPFs 504-1 and 504-2 and the LPFs 507-1 and 507-2.

The outputs of the LPFs 504-1 and 504-2 ($q_1'(t)$) and the LPFs 507-1 and 507-2 ($q_2'(t)$) can be expressed as shown in the following Eq. 9 after removing the second term of Eq. 8.

$$q_1'q_2'(t) = \frac{1}{2}Ae^{j2\pi\Delta f t} \quad [\text{Eq. 9}]$$

Hereinafter, the output of the LPFs 504-1 and 504-2 is represented by $q_1'(t)$, and the output of the LPFs 507-1 and 507-2 is represented by $q_2'(t)$. The frequency demodulation unit 505 detects the instantaneous frequency f(t) of $q_1'(t)$. In the absence of noise, the output is detected as the deviation $\Delta f$ of the tone frequency generated on the transmission side. However, depending on the reception level, the pulse-like noise is superimposed on x(t) by the noise inputted to the frequency demodulation unit 105 or the frequency demodulation unit 106 shown in FIG. 4, so that the detected frequency fluctuates.

Therefore, the LPF 506 smoothes the fluctuation of the detected frequency. Further, in order to exclude a case where the squelch signal is not superimposed on 0 to 300 Hz from the detection, the instantaneous power p(t) of $q_2'(t)$ is calculated by the power detection unit 508. The instantaneous power p(t) can be expressed as shown in the following Eq. 10.

$$p(t) = |q_2'(t)|^2 \quad [\text{Eq. 10}]$$
$$= \frac{1}{4}A^2$$

Similarly to the instantaneous frequency f(t), since the instantaneous power p(t) also fluctuates depending on the reception level, smoothing is performed by the LPF 509.

The process of assessing the presence or absence of the tone squelch signal by the assessment unit 510 will be described.

The assessment unit 510 detects the rising edge of the tone squelch signal by using the frequency information inputted from the LPF 506 and detects the falling edge of the tone squelch signal by using the power information inputted from the LPF 509.

Figure 7:
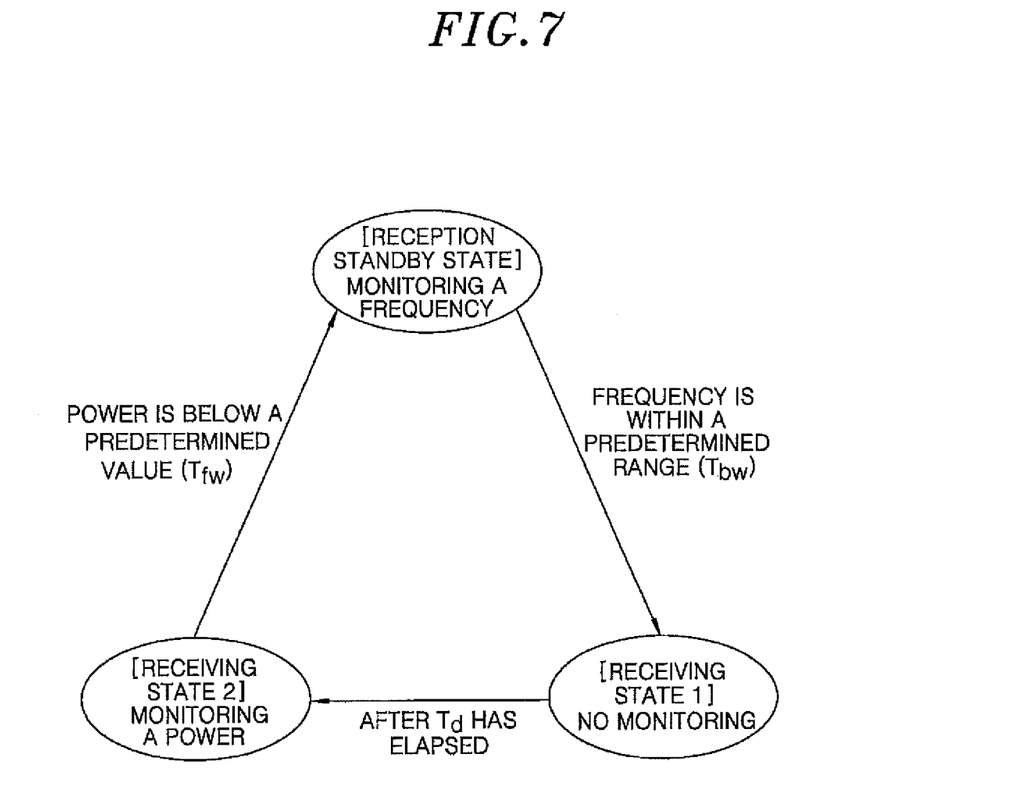
FIG. 7 is an explanatory diagram showing an overview of the processing performed by the tone squelch detection unit of FIG. 4.

FIG. 7 shows an overview of the process for assessing the presence or absence of the tone squelch signal by the assessment unit 510. In FIG. 7, a "standby state" is a state of awaiting reception, which is a muted state. Further, each of "receiving state 1" and "receiving state 2" represents an unmated state in which the tone squelch signal is detected.

The initial state at the start of the wireless device 2 is the "standby state". In this "standby state," the assessment unit 510 monitors the frequency information outputted from the LPF 506. In this state, if the detected frequency is within a predetermined frequency range $\pm f_{th}$ (e.g., $f_{th}$=2 Hz) continuously for a predetermined time $T_{bw}$ (e.g., $T_{bw}$=80 ms), it is assessed that the tone squelch signal is present, and the assessment unit 510 unmutes the audio amplifier 110. At the same time, the state is transited (moved) to the "receiving state 1."

In the "receiving state 1," the assessment unit 510 neither monitors the frequency information nor monitors the power information. The reason for this will be described later. During the "receiving state 1," the audio amplifier 110 is unmuted. When a predetermined time Td has elapsed after the state becomes the "receiving state 1," the state is transited (moved) to the "receiving state 2."

In the "receiving state 2," the assessment unit 510 monitors the power information outputted from the LPF 509. In the "receiving state 2," if the detected power is equal to or less than the predetermined power value $p_{th}$ (e.g., $p_{th}$ =0.1×$A^2$/4 (−10 dB of $A^2$/4)) continuously for a predetermined time $T_{bw}$ (e.g., $T_{bw}$=40 ms), the assessment unit 510 mutes the audio amplifier 110, and the state is transited (moved) to the "standby state."

As described above, in the "standby state," the assessment unit 510 monitors the frequency information outputted from the LPF 506, and in the "receiving state 2," the assessment unit 510 monitors the power information outputted from the LPF 509. Comparing the LPFs 504-1 and 504-2 located in front of the LPF 506 with the LPFs 507-1 and 507-2 located in front of the LPF 509, since the LPFs 507-1 and 507-2 are set to have a narrower band (steep cutoff characteristics), the delay time of LPFs 507-1 and 507-2 is greater. Accordingly, in the "receiving state 1," standby is performed while maintaining the unmute state for the predetermined time Td corresponding to the output delay of the LPF 509 to the LPF 506.

Thus, in a reception standby state (where the tone squelch signal has not been detected yet) of the audio signal, the assessment unit 510 performs frequency detection based on the signal band-limited by the LPFs 504-1 and 504-2 having a passband wider than that of the LPFs 507-1 and 507-2 and assesses the presence or absence of the tone squelch signal based on the detected frequency. Therefore, even if a random noise is inputted when there is no input of the audio signal, since the detected frequency changes in a wide range (passband of the LPFs 504-1 and 504-2), the detected frequency is less likely to fall in a range of $f_{th}$, and it is possible to prevent erroneous detection of the tone squelch signal.

Further, in a state where the audio signal is received (the tone squelch signal is detected), the assessment unit 510 performs power detection based on the signal band-limited by the LPFs 507-1 and 507-2 having a narrow passband (the range of the allowable frequency error of the tone squelch signal) and assesses the presence or absence of the tone squelch signal based on the detected power. Even if the audio signal is mixed into the band below 300 Hz in which the tone squelch signal is superimposed, as long as it receives a signal component of the desired frequency (the frequency of the tone squelch signal to be received), since the detected power of the signal is not reduced, it is possible to maintain the detection state of the tone squelch signal. In other words, even if the audio component is mixed into the band below 300 Hz, the tone squelch signal can be identified.

As described above, in the wireless device 2 in accordance with the second embodiment of the present invention, the quadrature demodulation unit 503 shifts the frequency of the received baseband signal by a desired frequency (a frequency of the tone squelch signal that is set in its own unit, i.e., the tone squelch signal which causes unmute when received) in the negative frequency direction (toward 0 Hz). Accordingly, the band limitation can be achieved by the LPF, and the group delay can be significantly reduced compared with the case where the same bandwidth is achieved by the BPF. Therefore, the tone squelch signal can be detected reliably in a short time.

Furthermore, since a complex signal after quadrature demodulation is used, the phase information can be detected from the real and imaginary parts. Therefore, the sampling frequency required for frequency detection can be set to be low.

Thus, in the reception standby state of the audio signal, the frequency detection is performed based on the signal band-limited by the LPFs 504-1 and 504-2 having a passband wider than that of the LPFs 507-1 and 507-2 for limiting the band of the allowable frequency error range of the tone squelch signal, and the presence or absence of the tone squelch signal is assessed based on the detected frequency. Therefore, even if a random noise is inputted when there is no input of the audio signal, since the detected frequency changes in a wide range, the detected frequency is less likely to continuously fall in a desired frequency range, and it is possible to prevent erroneous detection of the tone squelch signal.

Further, in a state where the audio signal is received, the power detection is performed based on the signal band-limited by the LPFs 507-1 and 507-2 having a narrow passband (the range of the allowable frequency error of the tone squelch signal), and the presence or absence of the tone squelch signal is assessed based on the detected power. Even if the audio signal is mixed into the band below 300 Hz, since the detected power of the signal is not reduced as long as it receives a signal component of the desired frequency, the tone squelch signal can be identified.

Further, in the "standby state," if the detected frequency is within a predetermined frequency range continuously for a predetermined time, it is assessed that the tone squelch signal is present, and the state is transited (moved) to the "receiving state 1" such that the audio amplifier is unmuted. When a predetermined time has elapsed after the state becomes the "receiving state 1," the state is transited (moved) to the "receiving state 2." In the "receiving state 2," if the detected power is equal to or less than a predetermined power value continuously for a predetermined time, it is assessed that the tone squelch signal is absent, and the state is transited (moved) to the "standby state" such that the audio amplifier is muted.

Thus, in the case where the cutoff characteristics of the LPFs 507-1 and 507-2 are set to be steeper than those of the LPFs 504-1 and 504-2, the delay of the power detection for frequency detection can be absorbed by the "receiving state 1," and the detection of the tone squelch signal can be more stably performed.

In addition, it is configured such that the passband of the LPFs 504-1 and 504-2 is less than the frequency of the tone squelch signal, and less than the frequency obtained by subtracting the frequency of the tone squelch signal from the minimum frequency on which the audio signal is superimposed. Thus, it is possible to remove the component of the audio band and the DC component in the LPFs 504-1 and 504-2, and it is possible to further improve the accuracy of the frequency detection.

The present invention can be used in a general wireless device using a plurality of tone signals having different frequencies for muting in an analog FM scheme or the like. The wireless device includes a one-way communication device (e.g., wireless microphone), and a target to be muted is not limited to audible voice. The wireless device may further include a device which identifies multiple tones transmitted simultaneously without being limited to a single tone.

What is claimed is:

1. A wireless device for detecting a tone squelch signal contained in received baseband signals, comprising:
   a frequency shifting unit which shifts a frequency of the received baseband signal in a negative frequency direction by a preset frequency of the tone squelch signal;
   a LPF which removes unnecessary frequency components from an output of the frequency shifting unit;
   an assessment unit which assesses a presence or absence of the tone squelch signal based on an output of the LPF;
   a frequency detection unit which detects a frequency based on the output of the LPF; and
   a power detection unit which detects a power of the output of the LPF,
   wherein the assessment unit assesses that the tone squelch signal is present if the detected frequency is within a predetermined frequency range, and the detected power is equal to or greater than a predetermined power.

2. The wireless device of claim 1, wherein the frequency shifting unit shifts the frequency by performing quadrature demodulation on the received baseband signal.

3. A wireless device for detecting a tone squelch signal contained in received baseband signals, comprising:
   a frequency shifting unit which shifts a frequency of the received baseband signal in a negative frequency direction by a preset frequency of the tone squelch signal;
   first LPF which removes an unnecessary frequency component from an output of the frequency shifting unit;
   second LPF which removes an unnecessary frequency component from the output of the frequency shifting unit;
   a frequency detection unit which detects a frequency based on an output of the first LPF;
   a power detection unit which detects a power of an output of the second LPF; and
   an assessment unit which assesses that the tone squelch signal is present if the frequency detected by the frequency detection unit is within a predetermined frequency range continuously for a first predetermined time in a reception standby state, and assesses that the tone squelch signal is absent if the power detected by the power detection unit is equal to or less than a predetermined power value continuously for a second predetermined time in a receiving state.

4. The wireless device of claim 3, wherein the second LPF have cut-off characteristics which are set to be steeper than those of the first LPF, and wherein the assessment unit assesses that the tone squelch signal is present if the frequency detected by the frequency detection unit is within the predetermined frequency range continuously for the first predetermined time in the reception standby state and transits (moves) a state to a first receiving state, wherein the assessment unit transits (moves) the state to a second receiving state when a third predetermined time has elapsed after transition (movement) to the first receiving state, and wherein the assessment unit assesses that the tone squelch signal is absent if the power detected by the power detection unit is equal to or less than the predetermined power value continuously for the second predetermined time in the second receiving state.

5. The wireless device of claim 4, wherein the second LPF has a passband which is set to an allowable error frequency of the tone squelch signal, and the first LPF has a passband which is set to a frequency higher than the passband of the second LPF.

6. The wireless device of claim 4, wherein the passband of the first LPF is less than the frequency of the tone squelch signal, and less than a frequency obtained by subtracting the frequency of the tone squelch signal from a band of an audio signal.

7. The wireless device of claim 3, wherein the second LPF has a passband which is set to an allowable error frequency of the tone squelch signal, and the first LPF has a passband which is set to a frequency higher than the passband of the second LPF.

8. The wireless device of claim 3, wherein the passband of the first LPF is less than the frequency of the tone squelch signal, and less than a frequency obtained by subtracting the frequency of the tone squelch signal from a band of an audio signal.

9. The wireless device of claim 7, wherein the passband of the first LPF is less than the frequency of the tone squelch signal, and less than a frequency obtained by subtracting the frequency of the tone squelch signal from a band of an audio signal.

* * * * *